United States Patent
Skourup et al.

(10) Patent No.: US 8,627,740 B2
(45) Date of Patent: *Jan. 14, 2014

(54) ROBOT FOR HARSH OUTDOOR ENVIRONMENT

(75) Inventors: Charlotte Skourup, Drammen (NO); Johan Gunnar, Oslo (NO); John Pretlove, Sandvika (NO)

(73) Assignee: ABB Research Ltd., Zürich (CH)

( * ) Notice: Subject to any disclaimer, the term of this patent is extended or adjusted under 35 U.S.C. 154(b) by 377 days.

This patent is subject to a terminal disclaimer.

(21) Appl. No.: 13/060,874

(22) PCT Filed: Apr. 22, 2009

(86) PCT No.: PCT/EP2009/054782
§ 371 (c)(1),
(2), (4) Date: Feb. 25, 2011

(87) PCT Pub. No.: WO2010/022991
PCT Pub. Date: Mar. 4, 2010

(65) Prior Publication Data
US 2011/0154934 A1    Jun. 30, 2011

(51) Int. Cl.
*B25J 17/00* (2006.01)

(52) U.S. Cl.
USPC .......... 74/490.01; 74/490.03; 901/43; 901/50

(58) Field of Classification Search
USPC ............... 74/490.01, 490.02, 490.03, 490.05, 74/490.06; 901/46, 47, 43, 44, 45, 49, 50
See application file for complete search history.

(56) References Cited

U.S. PATENT DOCUMENTS

| | | | |
|---|---|---|---|
| 3,454,169 A | | 7/1969 | Bridges |
| 4,904,514 A | * | 2/1990 | Morrison et al. ............... 428/53 |
| 6,070,636 A | * | 6/2000 | Zaher ............................ 156/540 |
| 6,346,150 B1 | | 2/2002 | Conlin |
| 6,354,167 B1 | * | 3/2002 | Snow ......................... 74/490.01 |
| 2007/0086878 A1 | * | 4/2007 | Stanley et al. ........... 414/225.01 |
| 2007/0144298 A1 | * | 6/2007 | Miller ........................ 74/490.01 |
| 2008/0300722 A1 | * | 12/2008 | Dudek et al. ................... 700/258 |
| 2010/0291669 A1 | * | 11/2010 | Robinson et al. .......... 435/287.3 |
| 2011/0137458 A1 | * | 6/2011 | Hisatani et al. ................ 700/248 |
| 2013/0011234 A1 | * | 1/2013 | Pretlove et al. ............ 414/749.1 |

FOREIGN PATENT DOCUMENTS

| | | |
|---|---|---|
| EP | 0937551 A1 | 8/1999 |
| EP | 0988939 A1 | 3/2000 |
| FR | 1576689 | 6/1969 |
| JP | 63065973 A | 3/1988 |
| SU | 544549 A1 | 1/1977 |
| WO | WO-96/08347 A1 | 3/1996 |
| WO | WO-00/69601 A1 | 11/2000 |

OTHER PUBLICATIONS

Official Action issued by Russian patent office Mar. 15, 2013, in connection with counterpart application 2011111416 (With Translation).
Dan Rogers; "At arms's length"; Engineering for Innovators in Technology, Manufacturing and Management; Feb. 2008; pp. 24-26.
PCT/ISA/210—International Search Report—Nov. 24, 2009.
PCT/ISA/235—Written Opinion of the International Searching Authority—Nov. 24, 2009.
PCT/IPEA/409—International Preliminary Report on Patentability—Oct. 13, 2010.

* cited by examiner

*Primary Examiner* — David M Fenstermacher
(74) *Attorney, Agent, or Firm* — Venable LLP; Eric J. Franklin

(57) ABSTRACT

An industrial robot adapted for a harsh environment involving exposure to salt water. A robot arm includes a plurality of arm parts movable relative each other about a plurality of joints. Electrical motors move the arm parts. A salt water proof coating on at least a portion of an exterior of the robot arm parts.

18 Claims, 5 Drawing Sheets

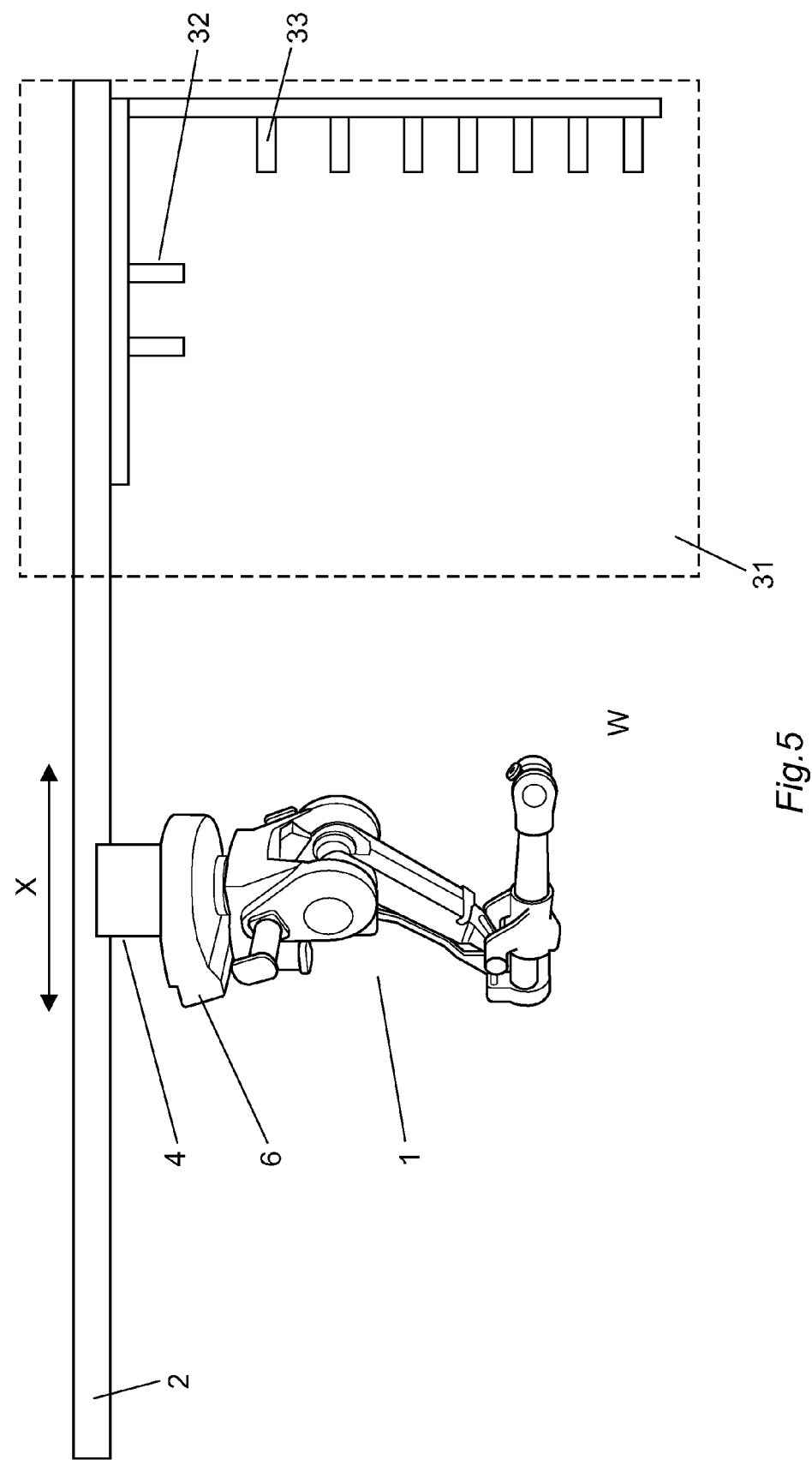

ROBOT FOR HARSH OUTDOOR ENVIRONMENT

CROSS-REFERENCE TO RELATED APPLICATIONS

This application is the national phase under 35 U.S.C. §371 of PCT/EP2009/054782 filed 22 Apr. 2009.

FIELD OF THE INVENTION

The present invention relates to an industrial robot including a plurality of arms movable relative each other about a plurality of joints and electrical motors moving the arms. The present invention also relates to a method for protecting an industrial robot from salt water.

In addition to those above, the invention also relates to the use of an industrial robot in an offshore oil and gas installation.

PRIOR ART

Within the field of oil and gas, robotics has generally been used only sporadic. Oil companies continuously seek to create and increase business value of oil and gas installations, whilst also maintaining an absolute focus on Health, Safety and Environment (HSE). To address these issues, a major rethink on the conventional operation and support of oil & gas installations is required. It is well documented that industrial robots with flexible manipulators are well suited to conduct dangerous and labor intensive tasks in hazardous conditions with a high degree of accuracy.

Conventional industrial robots are not designed for offshore use. Even though there is a trend to develop robot for harsh environment such as to be explosion safe, water resistant, and to tolerate low temperature below the freezing point and high temperatures, there still is a way to go to combine all of these features and to make the robots ready for offshore use. One of the main challenges to overcome is to make the robot resistant to salt water and especially, corrosion and other damages from salt water exposure.

Corrosion means the breaking down of essential properties in a material due to chemical reactions with its surroundings. In the most common use of the word, this means a loss of electrons of metals reacting with water and oxygen. Weakening of iron due to oxidation of the iron atoms is a well-known example of electrochemical corrosion. This is commonly known as rust. This type of damage usually affects metallic materials, and typically produces oxide(s) and/or salt(s) of the original metal. Corrosion also includes the dissolution of ceramic materials and can refer to discoloration and weakening of polymers by the sun's ultraviolet light.

Most structural alloys corrode merely from exposure to moisture in the air, but the process can be strongly affected by exposure to certain substances. Corrosion can be concentrated locally to form a pit or crack, or it can extend across a wide area to produce general deterioration. While some efforts to reduce corrosion merely redirect the damage into less visible, less predictable forms, controlled corrosion treatments such as passivation and chromate-conversion will increase a material's corrosion resistance.

Examples of different types of corrosion:
General corrosion
Pitting
Galvanic corrosion Further, the robot needs to be explosion safe which means that it generates limited amount of energy and heat in all electrical motors to avoid sparks. Further, the robot manipulator has to be IP67 certified which means that it is completely protected from intrusion of dust (including other small objects) and it is water resistant (no ingress of water when immersed up to 1 meter).

Finally, the robot is protected from influences from extreme temperatures (high and/or low) and wind. The protection may consist of coating(s) (such as for IP67 certified robots), overpressure in the motors and/or heating/cooling of the motors. Alternatively, the protection of the robots may be in form of a heating/cooling jacket which may also be water resistant (the robot manipulator may still be water proof due to condensation, etc.

OBJECTS AND SUMMARY OF THE INVENTION

The object of the present invention is to provide a robot for a hash outdoor environment.

This object is achieved by a robot is designed to resist salt water in a harsh environment.

According to one aspect of the invention this object is achieved with a method comprises regularly washing off the salt water from the robot.

This invention describes a harsh-approved manipulator developed for harsh outdoor environments with a focus on being protective against corrosion and other damages from salt water. The novelty of this method is that the robot manipulator is a standardized industrial robot with electrical motors which is further developed to operate under harsh climate conditions where it is exposed to salt water, which may have a corrosive effect on the robot.

It is proposed to implement robotics technology on oil & gas installations together with a redesign of the process equipment into compact standardized process modules. This novel concept will result in a remotely operated oil & gas facility capable of conducting inspection, maintenance and normal operational tasks and hence, improve HSE, industrial Health and Safety Executive i.e. reduce or remove issues of workplace safety. Also, the need for facilities for staff offshore will be reduced radically, which means lower weight of the platform and less investment costs. Further, this technological solution has the potential to reduce operational costs, thus increasing the profitable lifetime of the facility.

BRIEF DESCRIPTION OF THE DRAWINGS

Embodiments of the invention will now be described, by way of example only, with particular reference to the accompanying drawings in which:

FIG. 5 is a schematic diagram of an industrial robot mounted on a rail or gantry showing a washing booth into which the robot may be moved for washing and/or coating with anti corrosion fluid, according to another embodiment of the invention.

DETAILED DESCRIPTION OF PREFERRED EMBODIMENTS OF THE INVENTION

The main benefits of the new concept are significant reduction of CAPEX (capital expenditure), OPEX (operating costs) and construction time. To achieve this, the following solutions and technologies are fundamental:
- Modular process ("Lego"), designed for interactions with robotics technology
- Compact process equipment
- Use of gantry cranes
- Use of onshore control facilities
- Mobile decks (avoid scaffolding, multiple decks)
- Use of robotics for maintenance, inspection, safety and logistics operations
- Visualization technology for support during design, construction and operation with emphasize on robotics operation This invention concerns a method for protecting an industrial robot against salt water and particularly, corrosion and other potential damages as a consequence of exposure to salt water. The manipulator arm and the cable between the manipulator and the controller are exposed for the harsh requirements. The controller and the teach pendant may be built in a safe shell, or protected otherwise, and kept away from salt water. There are particularly two parts of the robot which need protection as these parts are vulnerable to corrosion and otherwise will suffer from the salt water. These are the robot arm itself and the joints including motors, bearings, etc. Conventional manipulator arms are often made of a metal, which may corrode and/or oxide. Stainless steel, plastic or other composite materials avoid this problem. The joints including motors and bearings are also critical to protect against salt water. Corrosion is a problem, but the salt crystals also have the potential to damage bearings and other mechanical constructions when entering into these. Unlike (grinding) dust, salt crystals are larger and have a different shape. The crystals may, for example, sit as a layer inside the bearings and prevent the balls from rolling freely. In other applications, small objects do not represent the same problems.

Figure 1:
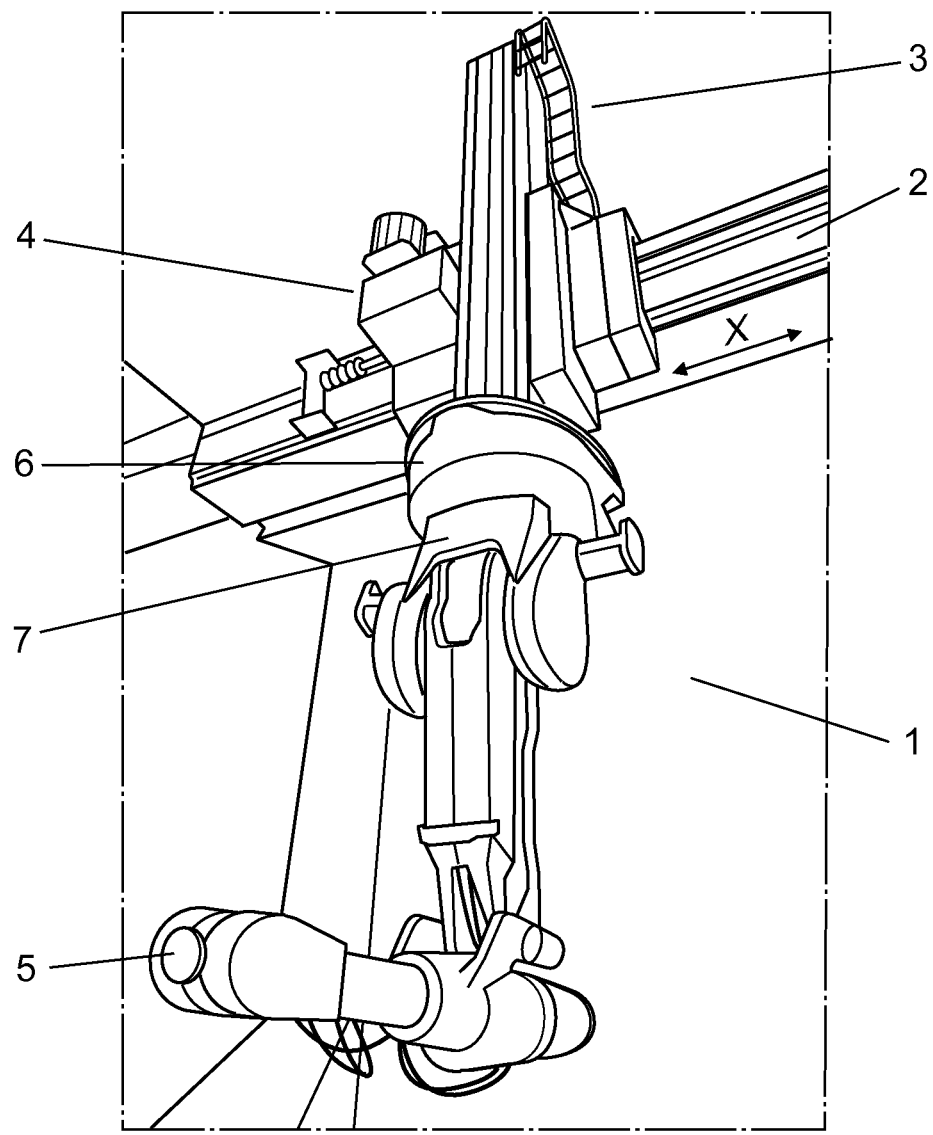
FIG. 1 is a representation of an industrial robot mounted on a rail or gantry the example shown being related to an oil production platform according to an embodiment of the invention.

FIG. 1 shows an industrial robot 1 mounted hanging down from a rail 2 or gantry and arranged mounted on a carriage 4 which is moveable along the gantry in the direction shown by arrow X. The industrial robot 1 is of the 6-axis type. The figure shows a base 6 holding the first joint axis and shows a tool holder 5 on the end of the robot arm. Cabling 3 is arranged suitable to allow the robot to move along the gantry back and forwards in the X axis of the gantry.

Figure 2:
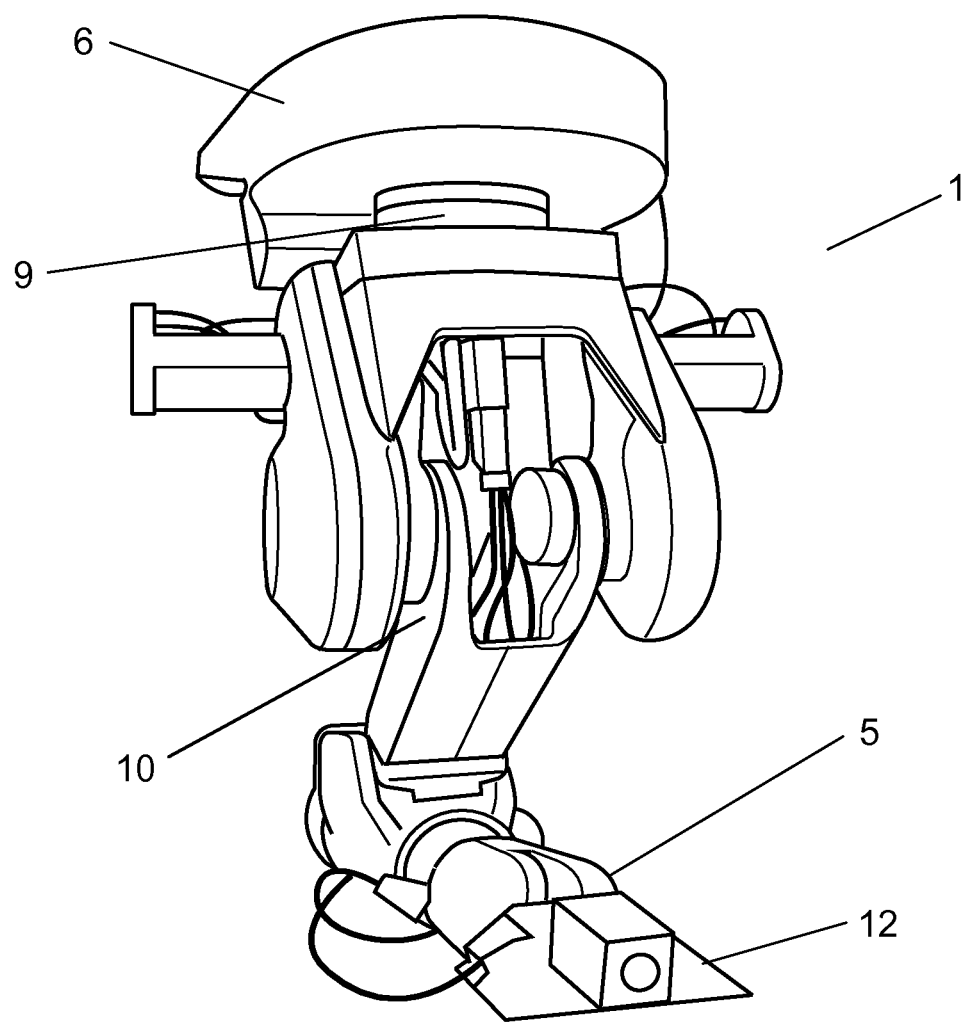
FIG. 2 is a representation of an industrial robot mounted on a rail or gantry showing a close up of the robot arm arranged with a camera according to another embodiment of the invention.

FIG. 2 shows the industrial robot 1 which has a first joint 9 in the base 6 which allows rotation about a vertical axis. A joint 10 is shown indicated. The metal parts of joints that are exposed to the air may coated with metal alloys or with thin film coatings to resist salt water corrosion. The metal alloys or thin film coatings may comprise alloys or compounds containing metals such as titanium, chromium or nickel. The industrial robot 1 arm or manipulator arm has a camera 12 mounted at the tool holder 5. The camera is arranged to display a view at or around the tool centre point for a remote operator, and may be arranged moveable to point or focus at objects in other positions.

Figure 3:
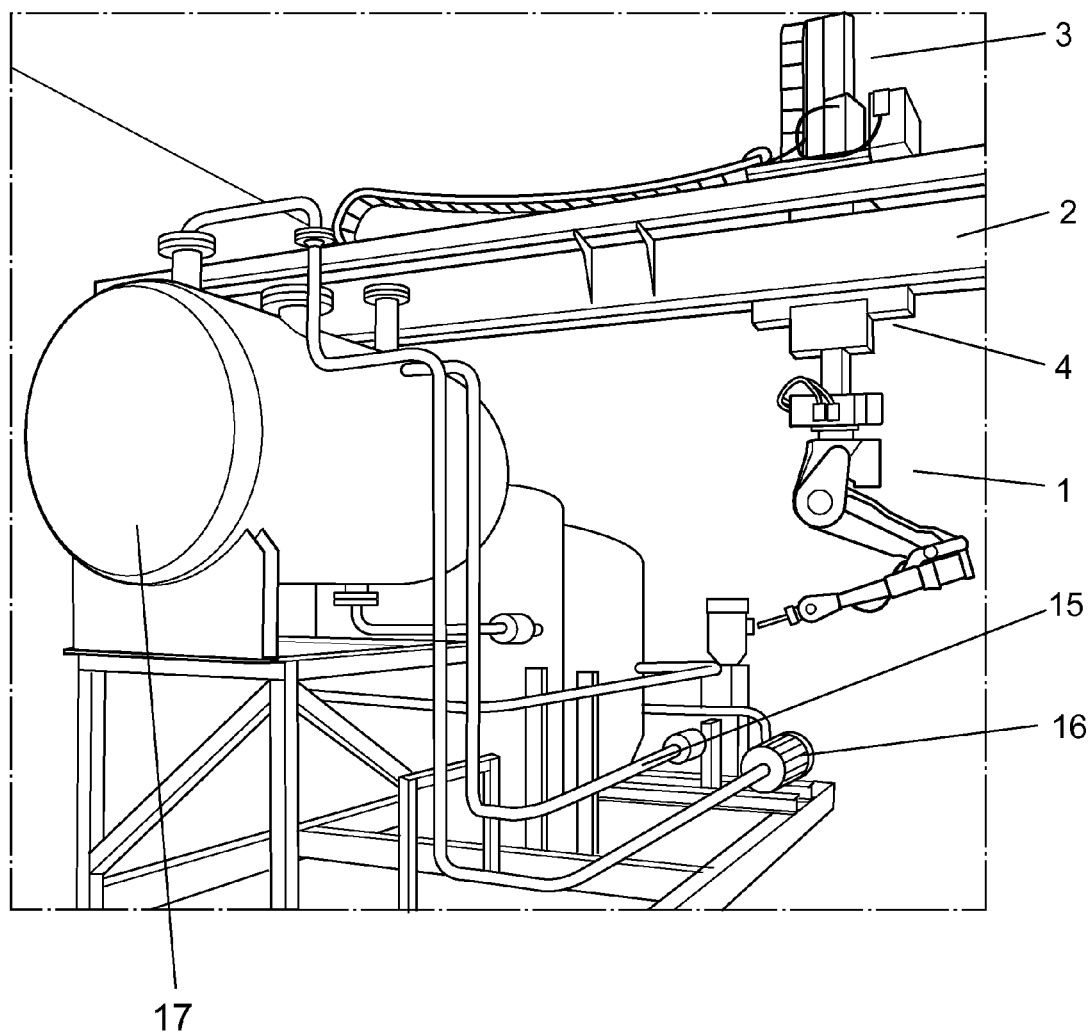
FIG. 3 is a representation of an industrial robot mounted on a rail or gantry arranged for inspection or monitoring or maintenance of a process section with tank, pumps and piping related to an oil production platform according to another embodiment of the invention.

FIG. 3 shows a test installation for a process section suitable for an oil and gas extraction or production installation. It shows a tank 17, process piping 15, a pump 16 and an industrial robot 1 mounted on a gantry 2 above the process section. Thus the robot may be moved to different points in the process section to point a camera for inspection purposes or to carry out a limited range of maintenance tasks.

Figure 4:
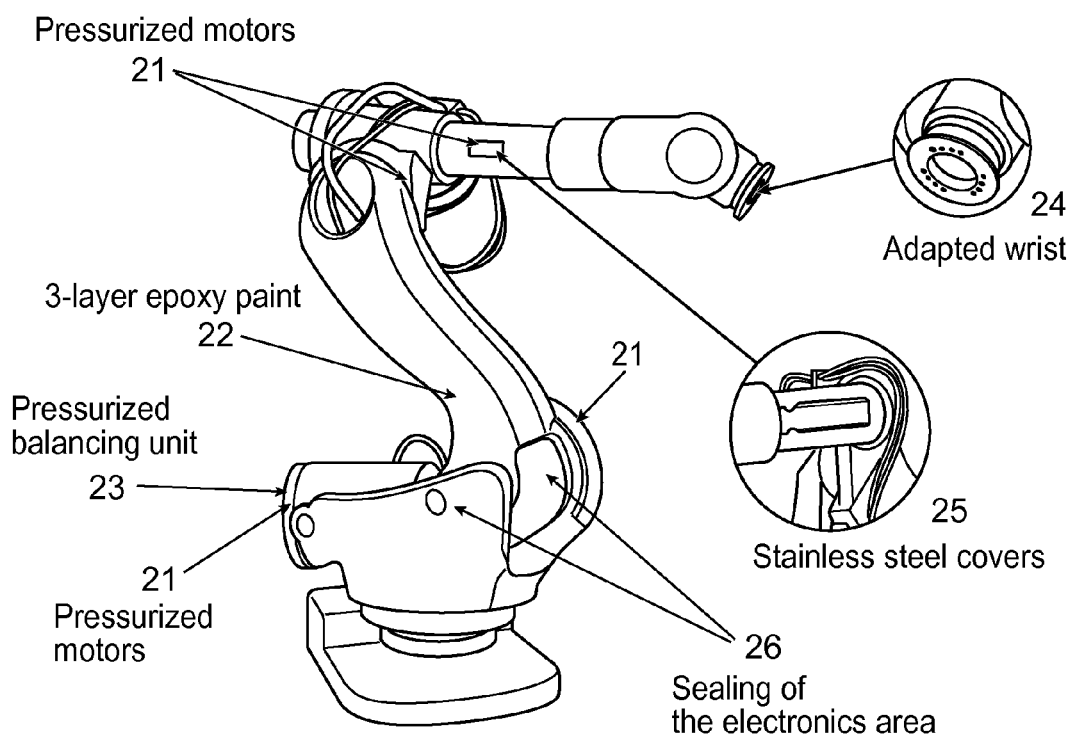
FIG. 4 is a representation of an industrial robot with parts of the robot indicated adapted to resist a harsh environment according to another embodiment of the invention.

FIG. 4 shows an industrial robot adapted to resist a harsh environment. It shows that the drive motors for moving each part of the arm may be arranged as pressurized motors 21 to prevent the ingress of surrounding air into the motors to reduce the risk of fire or an explosion. The balancing unit 23 may also be pressurized. The exposed metal parts of the robot are coated with a corrosion resistant layer such as a 3-layer epoxy coating 22 to protect the parts from corrosion or other chemical attack. The electronics parts 26 are sealed off from the environment. Parts of the arms or joints are arranged with stainless steel covers 25. The wrist 24 which normally holds a toolholder or a tool is a wrist with corrosion-resistant metal parts and bearings sealed against ingress of water or dust.

FIG. 5 shows schematically a washing and/or coating booth W for an industrial robot. The booth may comprise an enclosure 31 shown here as a box with dashed lines. This "box" may be open and may have curtains or doors to close off the booth. Washing heads or spray heads 32, 33 etc are arranged to wash down the industrial robot. Different washing fluids may be used. One or more air jets may also be included to blow of dirt and salt and/or to dry the robot. Coatings may be applied using one or more fixed or moveable spray heads in the washing booth W. Corrosion resistant coatings may be applied as a liquid, an emulsion or a gel-like layer. Salt water resistant coatings are described below.

This invention describes three different approaches regarding how to protect the robot from salt water which are to:
- Avoid salt water
- Allow salt water
- Protect with salt water The first approach is about protecting the robot from direct exposure of salt water. Methods for this approach include different types of coatings and other physical barriers between the robot and salt water.

The second approach allows salt water to get in (limited) contact with the robot. These methods comprise periodically cleaning of the parts which have been exposed to salt water.

The third type of methods takes an unconventional approach as the goal of these methods is to protect the robot with salt water. There are different types of corrosion. Apart from galvanic corrosion, both (salt) water and air in contact with the metallic surface result in corrosion.

The following list presents different ways of protecting the robot:
1. (Salt) water proof coating and/or film
2. Robot cover/jackets
3. Nano particles to reject water
4. Rubber covers around the joints and other inputs/outputs
5. Over pressurized air inside robot arm
6. Robot coating booth to regularly apply new coating/film to the robot
7. Robot coater
8. Robot washing booth to regularly wash off the salt water
9. Robot washer
10. Air jets to blow off dirt including salt crystals
11. Coating consisting of nano particles which tie up salt water to continuously cover the robot manipulator with a thin layer of salt water Several of the proposed methods may be applied to the robot to protect all parts properly from different types of damages and problems caused by the exposure to salt water.

1: This solution suggests painting/covering the robot arm and other parts of the robot with a layer of coating, or film, which is salt water resistant. Such a coating will prevent salt water from getting in contact with the material of the robot arm and from entering the robot arm. Such a layer of coating will typically be damaged when the surface (e.g. the layer of coating) has got a scratch. On the surface of stainless steel, there is a thin film which protects it from oxidation.

2: A robot cover or jacket covers the entire manipulator arm and protects the arm from salt water. In addition, a robot cover may also protect against dust, wind, water, etc. The robot cover may further provide functionality such as heating and/or cooling. Also, over-pressurized air inside the robot cover prevents damp.

3: This method proposes to cover the manipulator arm with a layer of nano particles which reject salt water and prevent salt crystals to be attached to the surface.

4: This method concerns how to protect the joints from intrusion of salt water. A rubber cover or bellows which is elastic and follows the robot's movements is mounted around each joint and glued/welded to the robot arm to avoid intrusion of salt water. This method may be combined with other methods to protect against corrosion of the robot arm as well as to avoid condensed water/damp inside the robot arm.

5: Instead of "sealing" the joints, this method suggests to apply over-pressurized air within the robot arm to avoid water and particularly salt water (and other small particles) from intruding/entering through joints and other small openings such as inlets and outlets of cables (electrical, (pneumatic) air, fluids, etc.). Similarly, the air will prevent damp inside the robot arm. Another possible function of the air is to control the temperature of the air to keep it within a certain range in case of either very low or very high outdoor temperatures.

6: This method is based on the "car washing machine" principle. A coating booth, W which the robot arm enters regularly, sprays a new coating/film onto the surface. A precondition is that the coating/film needs to be redone and that it is environmental and cheap in order to be used regularly. The coating booth may be shaped as a box with the minimum inner dimensions of the robot. Alternatively, it can be a pipe with the length and dimensions of the robot arm. When the robot is freed up from other tasks, it enters the coating booth (regularly, but not too often) and gets a new coating.

7: Instead of a booth, this method suggests that the robots do the coating of each other. It requires that at least two robots are freed up from other activities at the same time. One of the robots picks up a spray gun and sprays/"paints" the other robot, and vice versa (in case both robots need new coating). To avoid any environmental problems due to the spraying, it may take place in a specific (protected) area where the vast of the coating can be collected.

8: In case the manipulator arm only is exposed for limited amount of salt water or damp/humidity including salt, a solution is to use a robot water cleaning system. Robot washing booth W based on the "car washing machine" principle is a booth similarly to the one described in method 6. Instead of applying a new layer of coating/film, it cleans the manipulator arm with clean water, eventually with added detergent to keep the surface clean and free from salt crystals.

9: Similar to 7 this method describes how to use the robot itself to water clean another robot as an alternative to the "robot washing booth".

10: This method suggests to use air jets to blow off salt water and particularly, salt crystals from the surface of the robot manipulator. The air jets may be located inside a booth W as suggested in 6 and 8.

11: Instead of keeping salt water away, this method takes a different approach as it proposes to cover the manipulator arm with a layer of nano particles which tie up salt water. The robot surface is then covered with a complete layer of salt water but not exposed to the air. This may prevent some types of corrosion to occur.

The invention describes a harsh-approved manipulator developed for harsh outdoor environments with a focus on being protective against corrosion and other damages from salt water. The robot manipulator is a standardized industrial robot with electrical motors which is further developed to operate under harsh climate conditions where it is exposed to salt water. The manipulator arm and the cable between the manipulator and the controller are exposed for the harsh requirements. Particularly, all openings including joints, cables and tubes going through the surface, are critical to protect to avoid salt water, or damped salt water, from entering the inside of the robot arm. The controller may be built in a safe shell and kept in a less harsh location. This invention proposes several different ways of protecting the robot manipulator from corrosion. Basically, corrosion from salt occurs most intense where metal is exposed to a combination of salt water and air. Material being completely covered by salt water all the time is less vulnerable for corrosion. The invention is based on three different approaches to the problem: To prevent contact between salt water and the robot or the vulnerable parts of the robot, to allow contact between salt water and the robot, and to expose the robot continuously with salt water. Some of the methods may protect either the robot arm from corrosion or the joints from salt crystals.

This invention describes a remotely operated harsh approved robot manipulator for use in environments which are normally dangerous, difficult and/or impossible for humans to access.

Inspection of Infrastructure on Offshore Installations

Future offshore installations are planned to be (partly) unmanned. The process is redesigned into standardized process modules built upon each other into process racks. A number of robots are mounted on (at least) two gantry cranes which allow full access to the entire process. These robots are remotely operated from onshore (or a neighbor platform or ship). As the field operators are removed from the platform, the operators in the operation centre still need to inspect the process equipment and infrastructure and will use the robots for this task. Some of the inspection tasks are performed automatically whereas others need human intervention. Some tasks may be controlled remotely by one or more people on shore, ship and/or other platform. Control and/or communication elements may be arranged at the remote location where people can remotely control and communicate with the robots. Such remote operation may be carried out with any number of tasks. For example, robots including one or more protection features and included in an installation for extraction or production of petroleum products and arranged for carrying out monitoring and maintenance instructions may be remotely operated by people on ship, shore and/or other platform. The robot(s) may hold different sensors such as cameras 12 (video, IR, etc.), temperature gauge, vibration sensors, gas detectors, etc. The robots may be exposed for a rough environment including risk of explosions, (salt) water, extreme temperatures and wind.

Light Maintenance Operations on Offshore Installations

This scenario is based on the same concept as described above. The robotics system is further set up to perform light maintenance tasks on the process equipment such as to replace a pipe section or a valve and to place and collect wireless instrumentation. The robots are exposed for a rough environment including risk of explosions, (salt) water, extreme temperatures and wind.

Sample Taking on Offshore Installations

On an offshore drilling installation and/or production installation, there is a large need for sample taking. Some existing platforms struggle with very thick oil, almost like tar. A harsh-approved robot can perform the taking of samples and automate this task to reduce the risks on humans. The robot for this scenario is exposed for a rough environment including risk of explosions, (salt) water, extreme temperatures and wind.

Drilling and Other Operations on Onshore High-Sulfate Fields

Some onshore oil and gas fields contain sulfate which make it impossible for people to work unprotected in these areas. Robotized solutions are demanded for inspection and different operation tasks to be able to operate in such areas. The robots are exposed for a rough environment including different chemicals. The robot manipulator may be protected from such chemicals based on one, or more, of the proposed methods.

Inspection and Maintenance Operations of Offshore Windmills

Another offshore application is inspection and maintenance tasks of offshore windmills. Most tasks may be inside the windmills housing, but the damped air will still contain salt crystals.

This invention describes a number of methods to protect the robot arm from corrosion and the joints from entering of salt water. One or more methods may be used in combination to give full protection. The invention makes operations possible in harsh, offshore environments. The invention expands usage of existing industrial robot configuration with electrical motors to offshore environments, or similar environments with corrosive challenges.

The invention claimed is:

1. An industrial robot adapted for a harsh environment involving exposure to salt water, comprising:
   a robot arm comprising a plurality of arm parts movable relative each other about a plurality of joints;
   electrical motors configured to move the arm parts; and
   a coating on at least a portion of an exterior surface of the robot arm parts, the coating comprising nano particles configured to bind salt water to continuously cover at least a portion of the exterior surface of the robot arm with a layer of salt water.

2. The robot according to claim 1, further comprising: rubber gaskets around the joints.

3. The robot according to claim 1, further comprising: a source of over pressurized air inside the robot arm.

4. The robot according to claim 1, wherein the robot is arranged to be remotely operated.

5. The robot according to claim 1, wherein at least one section of the robot arm is coated with a layer to withstand movement of salt ions through the layer and into underlying material of the arm.

6. The robot according to claim 1, wherein at least one section of the robot arm or joint part is coated with a corrosion resistant thin film comprising a compound containing at least one metal species from the group of: titanium, chromium, nickel.

7. The robot according to claim 6, wherein the at least one section of the robot arm or joint part is metal.

8. The robot according to claim 1, wherein the joints comprise a first axis joint that is sealed with a single oil seal or with two or more oil seals in series to exclude ingress of water when immersed up to 1 meter.

9. The robot according to claim 1, wherein the joints comprise at least one joint that is enclosed by a flexible bellows-shaped shroud, fastened with a water tight seal to a part of the robot arm on each side of the joint.

10. The robot according to claim 1, further comprising: at least one camera mounted on an arm of the robot.

11. The robot according to claim 1, further comprising: at least one camera mounted on an arm of the robot, wherein at least one of the at least one camera is arranged configured for movement and focussing on a point in space in a vicinity of a tool center point for a tool arranged mounted on said industrial robot.

12. The robot according to claim 1, further comprising: at least one camera mounted on the arm of the robot, wherein a point in space in a vicinity of a tool center point for a tool arranged mounted on said robot may be configured or selected from a number of different tool center points.

13. A method for protecting an industrial robot from salt water, comprising:
    providing at least a portion of an exterior surface of a robot arm with a salt water proof coating;
    moving the robot arm to at least one of a washing or coating booth where at least one of washing or coating is performed; and
    optionally re-applying, after performing at least one of washing or coating, a salt water roof coating to the robot.

14. The method according to claim 13, further comprising:
    moving the robot arm to a specific area and regularly washing off salt water from the robot;
    blowing off dirt including salt crystals from the robot utilizing air jets; and
    re-applying, after the washing, a salt water proof coating to the robot.

15. A robot system, comprising:
    a plurality of robots mounted on at least two gantry cranes, wherein the robots each comprise
      a robot arm comprising a plurality of arm parts movable relative each other about a plurality of joints,
      electrical motors configured to move the arm parts, and
      a coating on at least a portion of an exterior surface of the robot arm parts, the coating comprising nano particles configured to bind salt water to continuously cover at least a portion of the exterior surface of the robot arm with a layer of salt water.

16. An installation for offshore oil and gas extraction or production, comprising:
    at least one robot comprising
      a robot arm comprising a plurality of arm parts movable relative each other about a plurality of joints,
      electrical motors configured to move the arm parts, and
      a coating on at least a portion of an exterior surface of the robot arm parts, the coating comprising nano particles configured to bind salt water to continuously cover at least a portion of the exterior surface of the robot arm with a layer of salt water; and
    oil and gas extraction or production equipment.

17. The installation according to claim 16, wherein at least one robot is arranged to carry out monitoring and maintenance instructions, wherein at least one robot comprises control and communication equipment for remote control of the robot, and wherein at least one robot comprises salt water protection features on the structure of said robot.

18. The installation according to claim 16, further comprising:

a washing booth arranged to wash and/or coat the at least one robot with a corrosion inhibiting fluid.

* * * * *

UNITED STATES PATENT AND TRADEMARK OFFICE
CERTIFICATE OF CORRECTION

| | | |
|---|---|---|
| PATENT NO. | : 8,627,740 B2 | Page 1 of 1 |
| APPLICATION NO. | : 13/060874 | |
| DATED | : January 14, 2014 | |
| INVENTOR(S) | : Skourup et al. | |

It is certified that error appears in the above-identified patent and that said Letters Patent is hereby corrected as shown below:

On the Title Page, Item [60] Related U.S. Application Data

Should read

Provisional application No. 61/092,106, filed on August 27, 2008

Signed and Sealed this
Twentieth Day of May, 2014

Michelle K. Lee
*Deputy Director of the United States Patent and Trademark Office*